Figure 1:
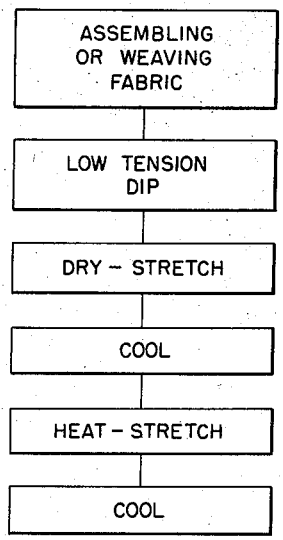

July 22, 1958     J. W. MEHERG ET AL     2,844,488

PROCESS FOR TREATING NYLON CORD FABRIC

Filed Feb. 2, 1955

*INVENTOR.*
JESS W. MEHERG
BY   JOE M. RIPPLE

ATTORNEY

United States Patent Office 2,844,488
Patented July 22, 1958

2,844,488

PROCESS FOR TREATING NYLON CORD FABRIC

Jess W. Meherg, Tallmadge, and Joe M. Ripple, Silver Lake, Cuyahoga Falls, Ohio, assignors to The Goodyear Tire & Rubber Company, Akron, Ohio, a corporation of Ohio Application February 2, 1955, Serial No. 485,682

4 Claims. (Cl. 117—7)

This invention relates to a method of treating a web or fabric of nylon or other similar thermoplastic materials and more particularly the invention pertains to a process for preparing and treating webs embodying a plurality of textile threads or cords of nylon and the like in substantially continuous lengths employed in the manufacture of tires and other similar rubber products.

In the manufacture of tires and rubber mechanical goods products, a strong durable reinforcing web or fabric is desired. Such a web or fabric should embody individual textile threads or cords of a type which will effectively resist heat and other deteriorating effects commonly experienced in the normal use of such products. Certain thermoplastic materials such, for example, as nylon in the form of textile threads or cords possess these desirable attributes.

It is well known, however, that nylon, for example, possesses other characteristics which are very difficult to control and when such material is incorporated in tires, belts and the like this material has a distinct tendency to stretch or grow when in use under varying conditions of load and other related factors. It is equally well known that the stretchability or the elongation of nylon may be considerably reduced during the processing of the nylon, however, though the elongation may be reduced within certain predetermined limits, the prior art methods result in a cord, or web or fabric comprising them, having relatively high dimensional instability.

By the term "dimensional instability" wherever used herein is meant that tendency of the web or fabric to retain a constant elongation after being incorporated into a tire or other similar rubber products which are subjected to varying load conditions and varying temperatures during operation.

It is well established that webs or fabrics from which pneumatic tires are fabricated must possess some degree of elongation within certain well defined limits in order that the tire cell will afford the desired cushioning action. Therefore, it should be distinctly understood that there is no desire to remove from the textile cords or the web or fabric comprising them all of the tendency of the material to elongate under load conditions, but to improve the dimensional stability of the cord.

It is one of the principal objects of the method of this invention to produce a web or fabric of nylon cords and the like which are so treated that they will not only resist the tendency to elongate unduly under load but will be dimensionally stable so that the resistance to elongation is maintained. It is a further object of the present invention to provide a web or fabric which has been prepared or treated to enable it to be incorporated into various rubber products such as tires and the like which possess predetermined controlled elongation characteristics and dimensional stability so as to prevent growth in the normal use of the resulting products in which the web or fabric is used.

Other objects of the invention will become apparent as the description of the process of the present invention proceeds.

In the drawings, Fig. 1 is a chart illustrating the steps in one form of the process.

Figure 2:
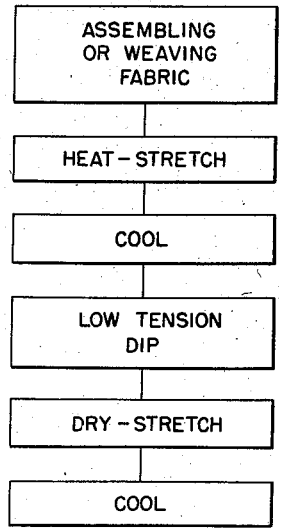

Fig. 2 is a chart illustrating the steps in a modified form of the process.

It will be noted from the drawings that the process of the present invention involves a plurality of steps, the first step in the operation involving the formation or weaving of a web of fabric embodying a plurality of spaced, parallel textile threads or cords of substantially continuous length with or without transverse threads, commonly known as woof or tie threads, to maintain the parallelism of the cords.

Referring to Fig. 1 of the drawings, the cord is then passed through a conventional coating or dipping apparatus wherein the individual threads or cords of the web or cord are subjected to the application of suitable bonding agents or adhesives to enhance the adhesion of the cords to rubber and to insure a positive bond thereto. To this end the fabric is introduced in web form under low tension to obtain deep penetration to a bath embodying the required bonding agents either by actual immersion or by contact with Scotch rolls. The tension applied to the cord during the application of the bonding agents is low and preferably sufficiently low to permit the cord to shrink whereby the elongation characteristics are materially increased. The bonding agents are ordinarily applied to the web in an aqueous solution and the bonding agents ordinarily tend to set or harden when they are subjected to heat.

After the dipping operation, the impregnated web is passed through a drying oven at temperatures higher than 200° F. so long as degradation of the cord is avoided, preferably at temperatures of 240° F. to 370° F. in order to dry the cord and to set or harden the bonding agent, and in accordance with this invention, the web is stretched during the drying operation so as to reduce the elongation characteristics of the cord below the elongation of the cord before or immediately after the application of the bonding agents. The amount of stretching tension applied to the cord during the drying operation is sufficient to result in a substantial increase in the length of the cord being treated, preferably approximately 6%. The stretching tension of approximately 0.6 to 0.8 gram per denier has been found to suffice for this purpose. After drying under stretching tension the cord is then allowed to cool to room temperature and is subsequently hot stretched on an apparatus similar to the stretching apparatus shown and described in U. S. Patent 2,679,088. During the hot stretching operation the elongation of the cord is further reduced by stretching the cord an additional amount by the application of heat at a temperature approximating the melting point of the nylon cord for an interval sufficient to plasticize the cord, a temperature of approximately 425° F. for a time interval of 36 to 24 seconds, the time being selected in inverse relation to the temperature applied has been found to be preferable. During hot stretching the stretching tension is sufficient to increase the length of the dipped and dried cord an additional 5% to 12% so that the total net gain in length during the process is approximately 12% to 16% and the elongation at ten pounds reduced to below at least 10%.

In accordance with the modification of this invention shown in Fig. 2 of the drawings the cord is first hot stretched on an apparatus similar to the stretching apparatus shown and described in United States Patent 2,679,088 after assembling and/or weaving but prior to the dipping operation. During the hot stretching operation of this modification of the invention the cord is stretched 10 to 16% by the application of heat at a temperature approximating the melting point of nylon or approximately 425° F. for a time interval of 36 to 24 seconds, the time being selected in inverse relation to the temperature applied. After the cord has been hot stretched it is allowed to cool to room temperature and is subsequently dipped at low tension in an aqueous solution of a suitable bonding agent. Following the dipping operation the cord is passed through a drying oven at temperatures of 240° F. to 370° F. in order to dry the cord and set or harden the bonding agent. During passage of the cord through a drying oven the cord is stretched so as to regain the loss in length during the dipping operation and to reduce the elongation thereof. The stretching tension applied to the cord is sufficiently high to reduce the elongation at ten pounds to an optimum amount for use in tires and similar articles, preferably less than 10%. It has been found that a tension of approximately 0.6 to 0.8 gram per denier applied during the drying of the cord will reduce the ultimate elongation the required amount, namely, to approximately 7%. The drying operation is followed by a cooling step to reduce the temperature of the cord to approximately room temperature after which the cord may be embedded in rubber by conventional calendering operations and subsequently built into tires and similar products.

By way of illustrating the advantages and improved results of the method of this invention over prior art methods, three batches of raw commercial nylon, 1850 denier, 0.02 gauge, 2-ply cord were processed as indicated below. The raw cord had a tensile strength of 27.2 lbs. and elongation at 10 lbs. and at break of 13 and 26% respectively. Batch No. 1 was processed according to the method illustrated in Fig. 1 of the drawings and described above, batch No. 2 was treated according to the method illustrated in Fig. 2 and described above, and batch No. 3 was treated according to the method illustrated and described in U. S. Patent 2,679,088 wherein all of the stretching of the cord is carried out after the cord has been impregnated with the bonding agent and dried. After the three batches had been processed each was tested for elongation and stability properties and the test results are shown in the following table:

|  | Batch No. 1—Hot Stretched Prior to Dipping | Batch No. 2—Hot Stretched Subsequent to Dipping | Batch No. 3—Stretched After Dipping and Drying |
| --- | --- | --- | --- |
| Tension during drying (Grams per denier) | 0.6 | 0.6 | 0.03 |
| Percent yards gained during drying | 5.7 | 0 | −7.4 |
| Percent yards gained during hot stretching | 6.8 | 12.4 | 16.8 |
| Total Net Gain | 12.6 | 11.3 | 8.3 |
| Tensile Strength | 28.2 | 28.5 | 28.1 |
| Elongation at 10 lbs | 7.0 | 7.3 | 8.1 |
| Elongation at 20 lbs | 10.8 | 11.1 | 12.0 |
| Elongation at Break | 18.6 | 20.8 | 19.2 |
| Shrinkage after one hour at 275° F | 6.5 | 6.0 | 7.2 |
| Shrinkage after cooling to room temperature | 4.9 | 4.5 | 6.0 |

From these results it will be seen that the cords processed according to this invention have an elongation under a load of ten pounds which is substantially reduced in comparison to the control cord. Furthermore, as illustrated by the shrinkage data the dimensional stability of cords treated according to this invention is substantially increased. The shrinkage data are the results of tests which may be performed in the laboratory and which are indicative of the dimensional stability of the cord, or the ability of the cord to maintain low elongation in use. If cords processed so as to reduce the elongation will completely maintain low elongation after being made into tires, the tires so made will not grow. The shrinkage data above indicates a material improvement in the dimensional stability or the ability of the cord to maintain low elongation after being put into service.

As a further illustration of the improved stability of the cords treated by the methods of this invention, test tires were built of cords from each of the batches of nylon tested above. The test tires were then run an identical number of miles under identical operating conditions and measurements of certain dimensions of the tires were made. For purposes of comparison the dimensions of the test tire made of cord from batch No. 3 treated according to a known process previously described was rated at 100 and the dimensions of the tires made from cord treated according to this invention were rated at the respective percentage of the dimensions of the control tire. The results of these tests were as follows:

| Test Tires | Sectional Diameter | Overall Diameter | Tread Width |
| --- | --- | --- | --- |
| Control Tire made from Batch #3 cord | 100 | 100 | 100 |
| Test Tire made from Batch #1 cord | 88 | 73 | 75 |
| Test Tire made from Batch 2 cord | 94 | 76 | 94 |

From these results it will be seen that the dimensional stability of the cords processed according to this invention is substantially increased over the growth of cords treated by prior art methods in that the growth of tires built from cords treated according to this invention is reduced as much as 25%.

Although the description of the method of this invention has been made in connection with nylon cord material, it is contemplated that the invention may be applied to other thermoplastic material, for example, polyethylene terephthalate fiber known commercially as Dacron or Terelene and described in British Patent No. 578,079.

While certain representative embodiments and details have been shown for the purpose of illustrating the invention, it will be apparent to those skilled in this art that various changes and modifications may be made therein without departing from the spirit or scope of the invention.

What is claimed is:

1. A process for reducing the elongation and increasing the dimensional stability of nylon cord fabric comprising, dipping the cord under low tension in an aqueous solution of a nylon cord to rubber bonding agent, drying the dipped cord at a temperature of 200 to 370° F. under a stretching tension of from .6 to .8 gram per denier, and subjecting the dried cord to heat at a temperature approximating that of the melting point of the individual cords for an interval of time less than that required to melt the cords and simultaneously stretching the cords under tension sufficient to stretch the cord 5 to 12%.

2. A process for reducing elongation and increasing the dimensional stability of nylon cord fabric comprising, dipping the cord under low tension in an aqueous solution of a nylon cord to rubber bonding agent, drying the dipped cord at a temperature of 200 to 370° F. and under a tension sufficient to elongate the cord approximately 6%, and subsequently stretching the dry cord at a temperature of approximately 425° F. for an interval of time less than that required to melt the cord and at a tension sufficient to stretch the cord 5 to 12%.

3. A process for reducing the elongation and increasing the dimensional stability of nylon cord fabric comprising, subjecting the cord while dry to heat at a temperature approximating that of the melting point of the individual cords for an interval of time less than that required to melt the cords and simultaneously stretching the cords under tension sufficient to stretch the cord 5 to 12%, thereafter dipping the cord under low tension in an aqueous solution of a nylon cord to rubber bonding agent, and thereafter drying the dipped cord at a temperature of 200 to 370° F. and under a stretching tension of from .6 to .8 gram per denier.

4. A process for reducing elongation and increasing the dimensional stability of nylon cord fabric comprising subjecting the cord while dry to heat at a temperature of approximately 425° F. for an interval of time less than that required to melt the cord and at a tension sufficient to stretch the cord 5 to 12%, thereafter dipping the cord under low tension in an aqueous solution of a nylon cord to rubber bonding agent, drying the dipped cord at a temperature of 200 to 370° F. and under a stretching tension sufficient to elongate the cord approximately 6%.

References Cited in the file of this patent

UNITED STATES PATENTS

| | | |
|---|---|---|
| 2,466,808 | Henning et al. | Apr. 12, 1949 |
| 2,514,187 | Bosomworth | July 4, 1950 |
| 2,624,934 | Munson et al. | Jan. 13, 1953 |
| 2,679,088 | Meherg et al. | May 25, 1954 |

FOREIGN PATENTS

| | | |
|---|---|---|
| 134,868 | Australia | Oct. 24, 1949 |